US009049299B2

(12) United States Patent
Nord

(10) Patent No.: US 9,049,299 B2
(45) Date of Patent: Jun. 2, 2015

(54) USING AUDIO SIGNALS TO IDENTIFY WHEN CLIENT DEVICES ARE CO-LOCATED

(71) Applicant: Citrix Systems, Inc., Fort Lauderdale, FL (US)

(72) Inventor: Joseph Nord, Lighthouse Point, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 14/068,614

(22) Filed: Oct. 31, 2013

(65) Prior Publication Data

US 2015/0117626 A1  Apr. 30, 2015

(51) Int. Cl.
*H04M 3/42* (2006.01)
*H04M 3/56* (2006.01)
*H04L 29/06* (2006.01)

(52) U.S. Cl.
CPC ............ *H04M 3/568* (2013.01); *H04L 65/403* (2013.01)

(58) Field of Classification Search
USPC ............... 379/202.01; 370/261; 709/204, 227
See application file for complete search history.

(56) References Cited

U.S. PATENT DOCUMENTS

| 7,616,750 | B2 | 11/2009 | Cadiz et al. |
| 7,620,166 | B2 | 11/2009 | Cadiz et al. |
| 8,428,240 | B2 | 4/2013 | Cadiz et al. |
| 2002/0101918 | A1* | 8/2002 | Rodman et al. ............... 375/224 |
| 2007/0050451 | A1 | 3/2007 | Caspi et al. |
| 2008/0069011 | A1 | 3/2008 | Sekaran et al. |
| 2008/0082187 | A1* | 4/2008 | Winterstein et al. ............ 700/94 |
| 2011/0019810 | A1 | 1/2011 | Alexandrov et al. |
| 2012/0226997 | A1 | 9/2012 | Pang |
| 2012/0254382 | A1* | 10/2012 | Watson et al. ................ 709/221 |
| 2012/0296959 | A1 | 11/2012 | Momchilov et al. |
| 2013/0044893 | A1* | 2/2013 | Mauchly et al. ................ 381/92 |

FOREIGN PATENT DOCUMENTS

| EP | 1973321 A1 | 9/2008 |
| EP | 2490427 A1 | 8/2012 |

OTHER PUBLICATIONS

EPO International Search Report; From PCT/US2014/062556, Mailing Date Jan. 19, 2015.

* cited by examiner

*Primary Examiner* — Quynh Nguyen
(74) *Attorney, Agent, or Firm* — BainwoodHuang

(57) ABSTRACT

A technique manages an online meeting. The technique includes providing an audio output signal to a first client device currently participating in the online meeting. The audio output signal directs the first client device to play a particular sound (e.g., a unique tone or a unique series of tones). The technique further involves receiving an audio input signal from a second client device. The audio input signal includes the particular sound. The technique further involves identifying the second client device as being co-located with the first client device in response to the audio input signal which includes the particular sound. Such operation enables the electronic circuitry (e.g., a processing circuit of an online meeting server) to learn whether any client devices are co-located and accordingly associate multiple devices to a single user connected to the online meeting.

21 Claims, 6 Drawing Sheets

USING AUDIO SIGNALS TO IDENTIFY WHEN CLIENT DEVICES ARE CO-LOCATED

BACKGROUND

A typical web meeting shares visual data and voice data among multiple web meeting participants. In particular, the web meeting participants connect their client devices (e.g., personal computers, tablet devices, phones, etc.) to a meeting server (e.g., through the Internet, through the plain old telephone system, through a cellular network, etc.). Once the client devices are properly connected, the participants are able to view visual content, as well as ask questions and inject comments to form a collaborative exchange even though the web meeting participants may be scattered among remote locations.

For example, suppose that a participant calls into an existing web meeting using a regular phone and also connects to the meeting from a computer to view collaborative screen content. To this end, the participant will dial a telephone number of the meeting server and, when prompted by the meeting server, will enter (i) a meeting identification number (e.g., "123-456-789") to identify a particular meeting and optionally may enter (ii) a participant identification number (e.g., "30") to identify the participant. For this example, consider that the user does not yet have or cannot provide an identification code. As a result, the meeting server connects the participant to the correct web meeting and, whenever the participant speaks, the graphical web meeting interfaces displayed on the monitors of the respective client devices connected to that web meeting identify that participant as the person who is talking as "phone caller" or "unknown".

SUMMARY

Unfortunately, it is possible for a participant to inadvertently open multiple microphones to the same web meeting. Consider that the user may have dialed into a meeting from a telephone and also connected to the meeting via the user's personal computer (PC). When a noise is made in the meeting, it is possible that an audio feedback loop will result where the sound from the PC speakers is picked up by the telephone microphone. This is a common outcome when the telephone is a speaker phone as is common on business desks. The audio received by the telephone microphone will be sent back into the web meeting system where it will then again be sent out by the PC audio speakers, creating an infinite feedback sound loop. This audio feedback loop will be rendered to all participants of the web meeting as an irritating series of echoes which sound like a helicopter, and the series of echoes may continue to disrupt the web meeting until the participant realizes what has happened and manually mutes the microphone of the telephone or the personal computer. Often, users do not believe that they are the source of the feedback loop and this can delay the start of meetings by many minutes.

Had the user provided an ID when connecting to the telephone dial in, the feedback loop would not occur since the computer microphone (and speakers) would be automatically muted by the meeting software as an action when the user provided his/her conference ID on the telephone connection. Users often do not enter optional data, especially in the case where the ID is provided on the computer screen and the user may not have this information available at the time of their dial in to the telephone connection. Users can enter ID information via telephone key pad at any time, but most will not do this once they have successfully entered the meeting as an unknown phone caller.

It would be desirable to have a means to automatically determine which telephones are associated with which computer systems, without relying on user input of an identification code. If this exists, the likelihood of startup feedback loops can be significantly reduced as the opportunity for multiple hot-microphones would be greatly reduced.

Conferencing systems commonly play "tones" to announce the arrival and departure of meeting participants. These tones are normally played to inform the audience. As disclosed herein, tones can be utilized for additional purposes to identify which conference participant is using which telephone connection.

Additional issues are possible beyond feedback loops. Depending on PC speaker volume, PC microphone gain, and telephone/speakerphone volume and microphone gain, it is possible that a feedback loop will not occur and the user will have two microphones open into the meeting concurrently. A slight time distortion will exists when the user speaks, but both audio signals can be heard by meeting participants and negatively affect the users' experience. This situation is likely to go unnoticed, especially if this user is not a primary speaker in the web meeting.

Additionally, suppose that the participant in the above-described web meeting situation wishes to continue to participate in the web meeting, but now wishes to make a personal phone call using a third phone, i.e., the user's mobile phone. If the participant is not careful, the participant may inadvertently create one or more undesirable situations. For example, knowing that he/she is dialed into the meeting on telephone, the participant may remember to mute the telephone microphone before placing or taking the personal call on mobile phone, but the participant will commonly fail to deactivate the microphone of the personal computer.

Unfortunately, the user speaking on mobile phone will now come through on the PC microphone, where it will be captured and shared in the web meeting. It is also possible that the user will mute the PC system microphone but leave the telephone microphone audible. In either case, the user's private phone call on the mobile phone will be broadcast for all to hear on the online meting. It is possible for a meeting organizer to mute the user's open microphone, but until this occurs the user's cellphone conversation will be audible to all on the web meeting.

In the case that the PC microphone is muted by the user but the speaker phone microphone is left enabled, the audience will hear the private conversation on the mobile phone, but the web meeting manager will have less ability to mute the user. The user telephone audio input will be known to the meeting system only as "telephone user" or "unknown" and, depending on the management interfaces made available to meeting organizers, it may not be possible to mute a single unknown caller. The organizer may have to mute all unidentified telephone based participants to mute the private conversation of the single mobile phone user.

Furthermore, the meeting server may not present the user of the regular phone (i.e., "Caller 30") and the user of the personal computer (i.e., "John Smith") as the same person. Rather, if the participant continues to use the regular phone for voice input and the personal computer for visual input, the web meeting interface will indicate that the voice input and visual input come from two different people (i.e., "Caller 30" vs. "John Smith") which may be confusing to the other participants of the web meeting.

In contrast to the above-described conventional situation in which it is possible for a participant to inadvertently operate multiple microphones in the same web meeting, improved techniques are directed to using audio signals to identify when client devices are co-located. Along these lines, a meeting server may send an audio signal to a first client device of an online meeting in order to cause the first client device to output a particular sound (e.g., a unique tone, a unique tone sequence, etc.). If a second client device of the online meeting captures this particular sound, the meeting server detects that the second client device is co-located with the first client device and is able to take remedial action such as automatically deactivating a microphone of one of the co-located client devices, associating the first and second client devices with the same username, and so on.

One embodiment is directed to a method of managing an online meeting. The method includes providing, by electronic circuitry, an audio output signal to a first client device currently participating in the online meeting. The audio output signal directs the first client device to play a particular sound. The method further includes receiving, by the electronic circuitry, an audio input signal from a second client device. The audio input signal includes the particular sound. The method further includes identifying, by the electronic circuitry, the second client device as being co-located with the first client device in response to the audio input signal which includes the particular sound. Such operation enables the electronic circuitry (e.g., a processing circuit of an online meeting server) to learn whether any client devices are co-located.

In some arrangements, the first client device includes a first operating microphone input, and the second client device includes a second operating microphone input. In these arrangements, the method further includes, after identifying the second client device as being co-located with the first client device, automatically muting (or suppressing) one of (i) the first operating microphone input of the first client device and (ii) the second operating microphone input of the second client device.

In some arrangements, automatically muting includes muting the second operating microphone input of the second client device while maintaining activation of the first operating microphone input of the first client device to continue to receive an audio input signal from the first client device. In other arrangements, automatically muting includes muting the first operating microphone input of the first client device while maintaining activation of the second operating microphone input of the second client device to continue to receive the audio input signal from the second client device.

In some arrangements, the electronic circuitry associates participant identifiers with client devices participating in the online meeting. In these arrangements, the electronic circuitry initially associates (i) a first participant identifier with the first client device and (ii) a second participant identifier with the second client device. In particular, one of the first participant identifier and the second participant identifier is a username (e.g., "Jane Doe"), and the other of the first participant identifier and the second participant identifier is an anonymous label (e.g., "Anonymous Caller"). In these arrangements, the method further includes, after identifying the second client device as being co-located with the first client device, concurrently associating the username with (i) the first client device and (ii) the second client device (e.g., replacing "Anonymous Caller" with "Jane Doe"). As a result, other participants of the online meeting are able to see the same username when the participant talks regardless of which client device the participant uses.

In some arrangements, the method further includes detecting a disconnection event in which one of the first client device and the second client device disconnects from the online meeting; and automatically un-muting (or reactivating) the one of the first operating microphone input of the first client device and the second operating microphone input of the second client device in response to detection of the disconnection event.

For example, suppose that the first client device is the participant's regular phone, and the second client device is the participant's personal computer. Further suppose that the meeting server automatically suppressed the audio input of the personal computer while the participant used the regular phone to talk during the online meeting. When the participant hangs up the regular phone, the meeting server may automatically un-mute the audio input from the personal computer.

In some arrangements, providing the audio output signal to the first client device includes providing different audio output signals to different client devices currently participating in the online meeting. In these arrangements, the different client devices play different sounds in response to the different audio output signals. Such operation enables the meeting server to perform auto-discovery of co-located client devices simultaneously.

In some arrangements, providing the different audio output signals to the different client devices currently participating in the online meeting includes directing the different client devices to play different audio tones. Here, the first client device plays, as the particular sound, a unique audio tone or a unique series of audio tones.

In some arrangements, each of the different audio tones corresponds to a respective frequency offset. For example, one client device may output a tone at 400 Hz, another client device may output a tone at 700 Hz, another client device may output a tone at 1000 Hz, and so on, where each frequency is 300 Hz higher. Other offsets are suitable as well such as 400 Hz, 500 Hz, 1000 Hz, etc. Moreover, the spectrum can be divided logarithmically rather than linearly.

In some arrangements, receiving the audio input signal from the second client device includes acquiring multiple audio input signals from multiple client devices currently participating in the online meeting. At least one of the multiple audio input signals includes the particular sound played by the first client device. If multiple audio input signals include the particular sound played by the first client device, the meeting server can mute the client device that provided the audio input signal with the particular sound at the highest volume level or gain. Alternatively, the meeting server can mute all client devices that provided the particular sound, and so on.

In some arrangements, the method further includes joining the first client device to the online meeting. In these arrangements, the electronic circuitry provides the audio output signal to the first client device in response to the first client device joining the online meeting.

In some arrangements, the method further includes joining the second client device to the online meeting. In these arrangements, the electronic circuitry provides the audio output signal to the first client device in response to the second client device joining the online meeting.

In some arrangements, the method further includes detecting an audio feedback event in the online meeting. In these arrangements, the electronic circuitry provides the audio output signal to the first client device in response to detection of the audio feedback event.

It should be understood that, in the cloud context, the electronic circuitry is formed by remote computerized resources distributed over a network. Such a computing environment is capable of providing certain advantages such as enhanced scalability, processing flexibility, etc.

Other embodiments are directed to electronic systems and apparatus, processing circuits, computer program products, and so on. Some embodiments are directed to various methods, electronic components and circuitry which are involved in managing an online meeting and using audio signals to identify when client devices are co-located during online meetings.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to using audio signals to identify when client devices are co-located. Along these lines, an online meeting server may send an audio signal to a first client device of an online meeting in order to cause the first client device to output a particular sound (e.g., a unique tone, a unique sequence of tones, etc.). If a second client device of the online meeting captures this particular sound, the meeting server detects that the second client device is co-located with the first client device and is able to take remedial action such as automatically deactivating a microphone of one of the co-located client devices to prevent formation of a feedback loop, associating the first and second client devices with the same username to improve identification of who is talking, and so on.

Figure 1:
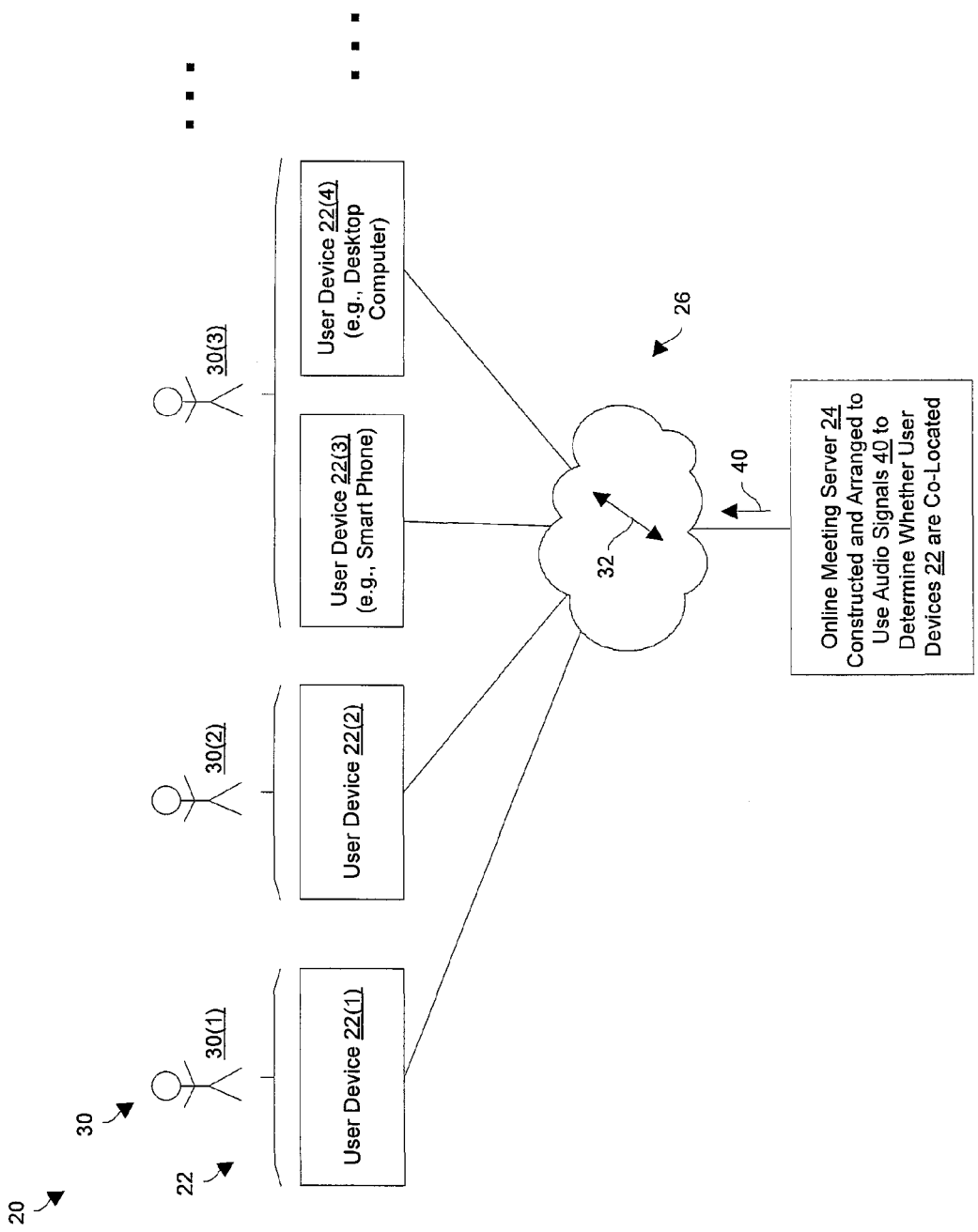
FIG. 1 is a block diagram of an electronic environment in which audio signals are used to identify when clients devices are co-located.

FIG. 1 shows an electronic environment 20 in which audio signals are used to identify whether clients devices are co-located. The electronic environment 20 includes user devices 22(1), 22(2), 22(3), 22(4), . . . (collectively, user devices 22), an online meeting server 24, and communications medium 26.

Each user device 22 is constructed and arranged to operate as an online meeting client, as well as perform other useful work on behalf of a user 30. A variety of apparatus are suitable for use as the user devices 22 such as general purpose computers, user workstations, laptop computers, tablets, smart phones, voice over IP (VoIP) phones, standard telephones, combinations thereof, etc. By way of example, the user device 22(1) is operated by a user 30(1). Similarly, the user device 22(2) is operated by another user 30(2). Additionally, the user device 22(3) (e.g., a smart phone) and the user device 22(4) (e.g., a desktop computer equipped with a microphone, speakers, display, etc.) are operated by yet another user 30(3).

The online meeting server 24 is constructed and arranged to host online meetings among the user devices 22 to enable the users 30 to share visual content, as well as ask questions and inject comments to form a collaborative exchange even though the users 30 may reside at different remote locations. When the online meeting server 24 hosts an online meeting, the online meeting server 24 may offer a variety of services including audio only, video only, a combination of audio and video, point-to-point, online conferencing, online webinars, online training, online technical assistance, online file sharing, online workspace sharing, online project management, online workflows, combinations thereof, and so on. As will be explained in further detail shortly, the online meeting server 24 uses audio signals to determine whether any of the user devices 22 are co-located, i.e., under operation of the same user 30 (e.g., see the user 30(3) in FIG. 1).

The communications medium 26 is constructed and arranged to connect the various components of the electronic environment 20 together to enable these components to exchange electronic signals 32 (e.g., see the double arrow 32). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, cellular communications, standard telephone communications, combinations thereof, etc.

During operation, each user device 22 is capable of connecting to an online meeting hosted by the online meeting server 24. As will be explained in further detail below, when a new user device 22 joins an online meeting, the online meeting server 24 provides audio output signals 40 to the user devices 22 which are already participating in the online meeting, i.e., to the user devices 22 which have already joined the online meeting. In response to the audio output signals 40, the user devices 22 play sounds which may be captured by the new user device 22 and thus indicate, to the online meeting server 24, that the new user device 22 is co-located with a user device 22 that is already participating in the online meeting.

In some arrangements, the particular sounds defined by the audio output signals 40 are at predefined frequency offsets such as 1,000 Hz, 2,000 Hz, 3,000 Hz, etc. In these arrangements, the particular sounds are easily detectable by a standard microphone.

In some arrangements, the user devices 22 play different tones (or different series of tones) in response to the audio signals 40. For example, if there are three user devices 22 currently participating in an online meeting, the online meeting server 24 may direct the first user device 22 to output a tone at 400 Hz, the second user device 22 to output a tone at 800 Hz, and the third user device 22 to output a tone at 1200 Hz. The online meeting server 24 may utilize a process having a different detection scheme (e.g., different frequencies, multiple different tones per each audio output signal 40, etc.) for different numbers of participating user devices 22.

If the online meeting server 24 receives an audio input signal 40 containing one of the played sounds from the user devices 22, the online meeting server 24 concludes that the new user device 22 that returned that audio input signal 40 is co-located with an existing user device 22 that is already participating in the online meeting. Accordingly, the online meeting server 24 is able to perform a remedial operation such as disabling the audio feed from new user device 22, labeling the new user device 22 and the existing user device 22 with the same username, and so on.

In some arrangements, the online meeting server 24 is capable of handling a situation in which the new user device 22 returns the particular sounds played by multiple user devices 22. That is, the new user device 22 may be within audio range of multiple user devices 22 participating in the online meeting (e.g., within an office area having tightly arranged cubicles, etc.). In this situation, the online meeting server 24 is still capable of performing a remedial operation such as disabling the audio feed from new user device 22, labeling the new user device 22 and the existing user device 22 with the same username based on the returned tone with the highest amplitude, and so on. Further details will now be provided with reference to FIG. 2.

Figure 2:
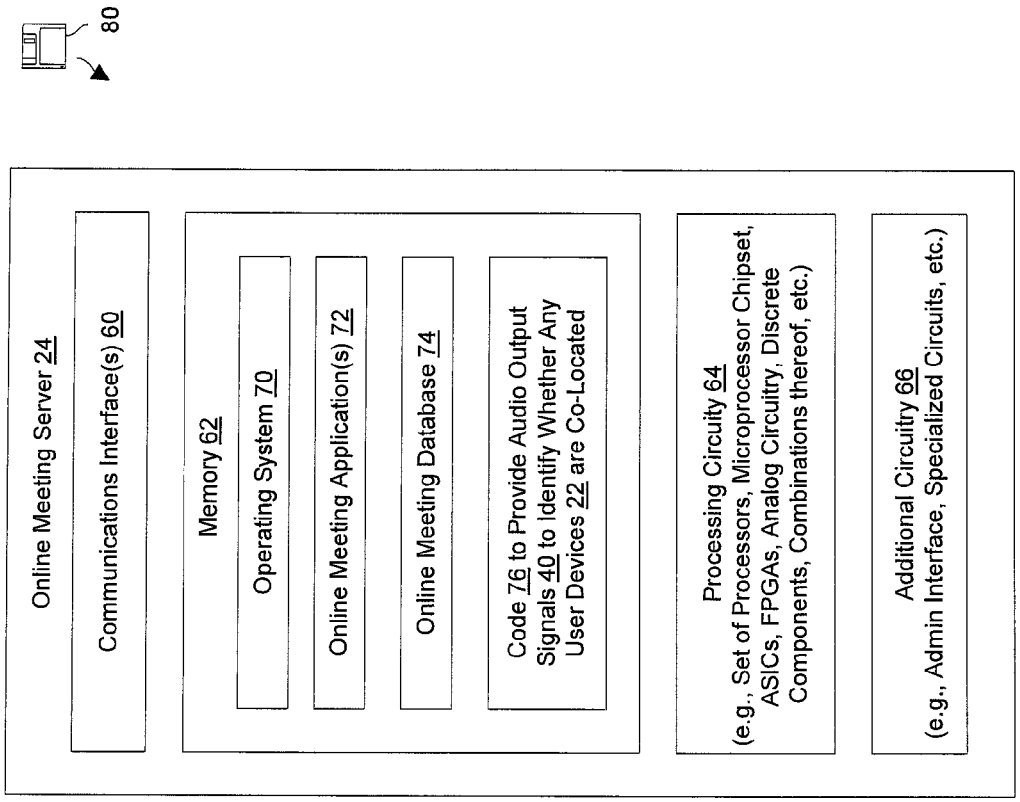
FIG. 2 is a block diagram of an online meeting server of the electronic environment of FIG. 1.

FIG. 2 is a block diagram of the online meeting server 24 of the electronic environment 20. The online meeting server 24 includes communications interfaces 60, memory 62, processing circuitry 64, and additional circuitry 66.

The communications interfaces 60 are constructed and arranged to connect the online meeting server 24 to the communications medium 26. The communications interfaces 60 can include network adapters to connect the online meeting server 24 to computer networks, plain old telephone system (POTS) adapters to connect the online meeting server 24 to the plain old telephone system, cellular telephony adapters to connect the online meeting server 24 to cellular phone networks, and so on. Accordingly, the online meeting server 24 is able to richly and robustly communicate with other components of the electronic environment 20.

The memory 62 is intended to represent both volatile storage (e.g., DRAM, SRAM, etc.) and non-volatile storage (e.g., flash memory, magnetic disk drives, etc.). The memory 62 stores a variety of software constructs including an operating system 70, online meeting applications 72, an online meeting database 74, and code 76 to provide the audio output signals 40 to identify whether any user devices 22 currently participating in an online meeting are co-located.

The processing circuitry 64 is constructed and arranged to operate in accordance with the various software constructs stored in the memory 62. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software to the online meeting server 24. The computer program product 80 has a non-transitory (or non-volatile) computer readable medium which stores a set of instructions which controls one or more operations of the online meeting server 24. Examples of suitable computer readable storage media include tangible articles of manufacture and apparatus which store instructions in a non-volatile manner such as CD-ROM, flash memory, disk memory, tape memory, and the like.

The additional circuitry 66 represents other hardware which may form part of the online meeting server 24. Examples of additional circuitry 66 include an administrator's interface such as a local console, user terminal, etc., specialized circuitry such as audio control and mixing circuitry, video graphics circuitry, etc., and so on.

During operation, the processing circuitry 64 executes the operating system 70 to manage various computerized resources such as memory, processing cycles, etc. When the processing circuitry 64 executes the online meeting applications, the processing circuitry 64 forms an online meeting engine which is capable of hosting multiple online meetings. The online meeting engine may include an audio engine which shares audio input from multiple users 30, a video engine which shares desktops of presenters and webcam input from multiple users 30, and so on. The online meeting database 74 includes online meeting data which supports the operation of the online meeting engine (e.g., user identifiers, user privileges, user passwords, data of online meetings in progress, etc.). When the processing circuitry 64 runs the code 76, the processing circuitry 64 is able to provide the audio output signals 40 (FIG. 1) to identify whether any user devices 22 are co-located.

It should be understood that a variety of events may cause the online meeting server 24 to provide the audio output signals 40 to detect the situations in which user devices 22 are co-located. In some arrangements, the online meeting server 24 provides the audio output signal 40 to user devices 22 already participating in an online meeting in response to a new user device 22 joining the online meeting. In some arrangements, the online meeting server 24 provides the audio output signal 40 to user devices 22 already participating in an online meeting in response to detecting an audio feedback event (e.g., a feedback loop which sounds similar to a nuisance helicopter noise). Other trigger situations are suitable as well (e.g., in response to a command, in response to detection of an audio anomaly, etc.). Further details will now be provided with reference to FIGS. 3 through 5.

Figure 3:
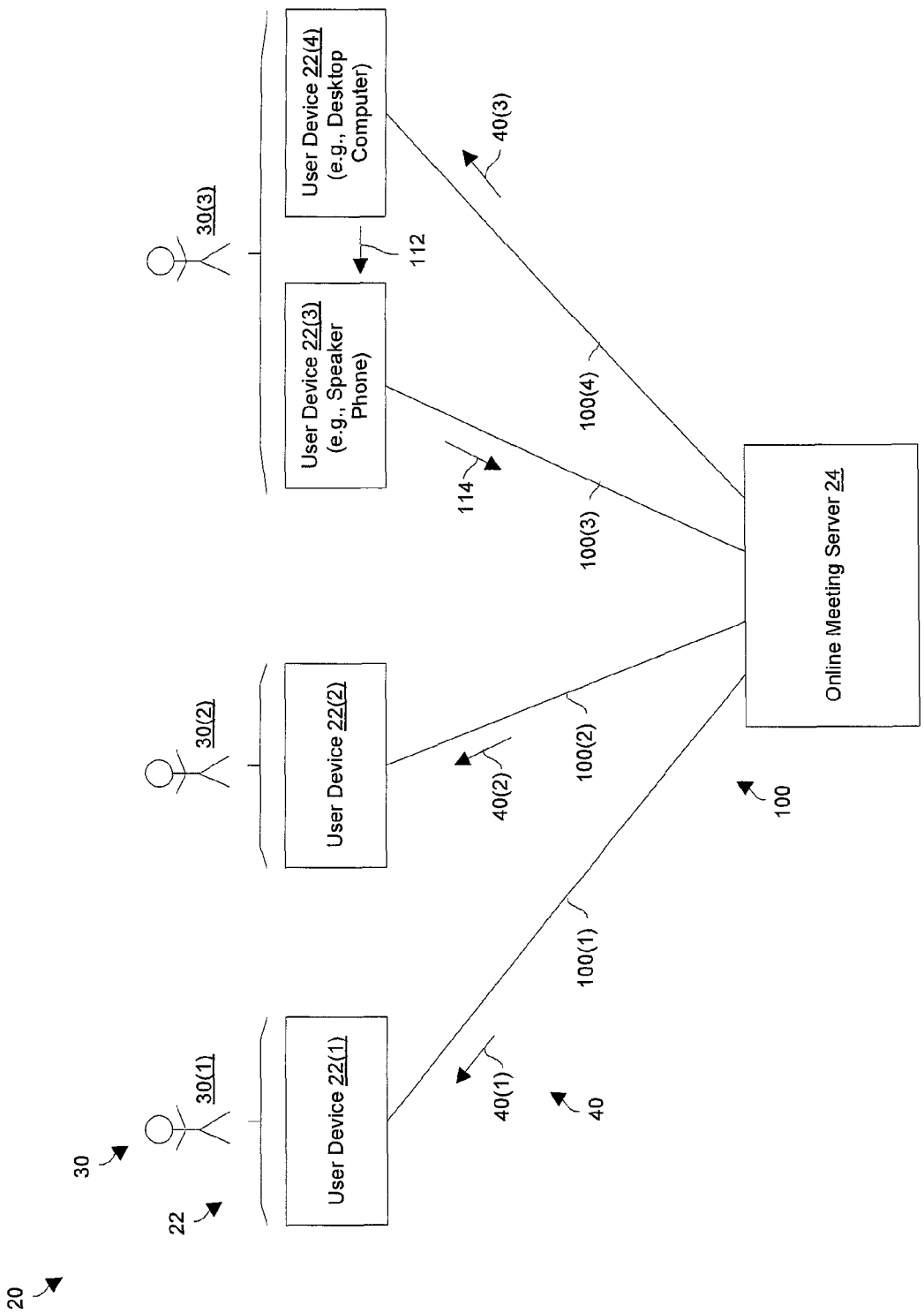
FIG. 3 is a block diagram of an example situation involving multiple user devices which are co-located during an online meeting.
Figure 4:
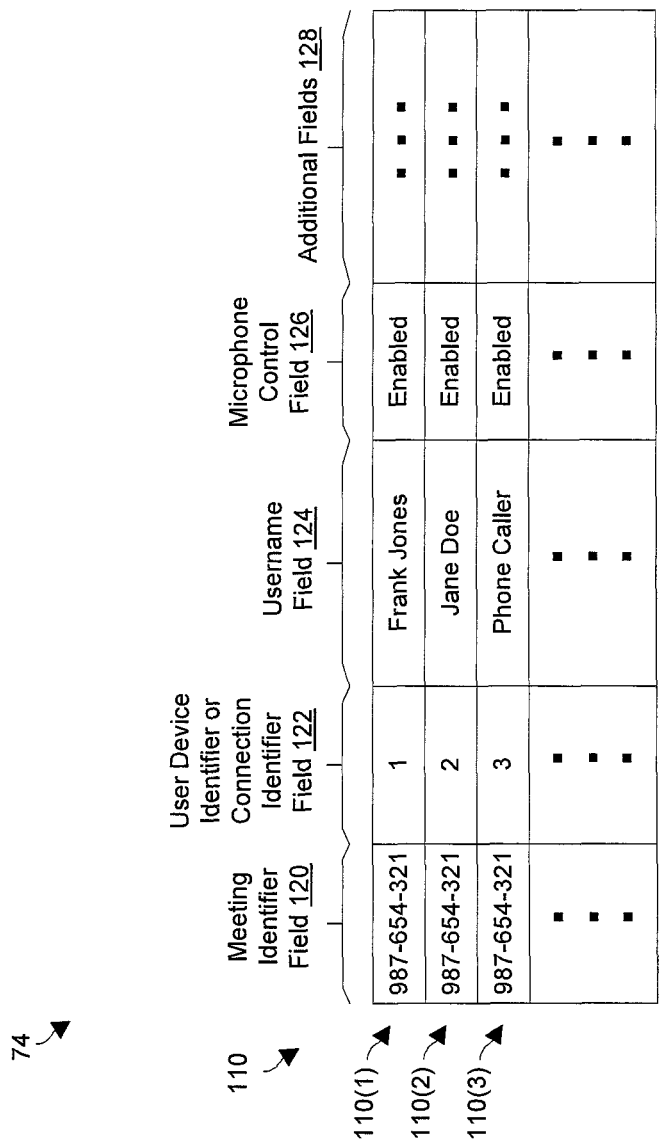
FIG. 4 is a block diagram of a portion of a database used by the online meeting server at a first time during the example situation of FIG. 3.
Figure 5:
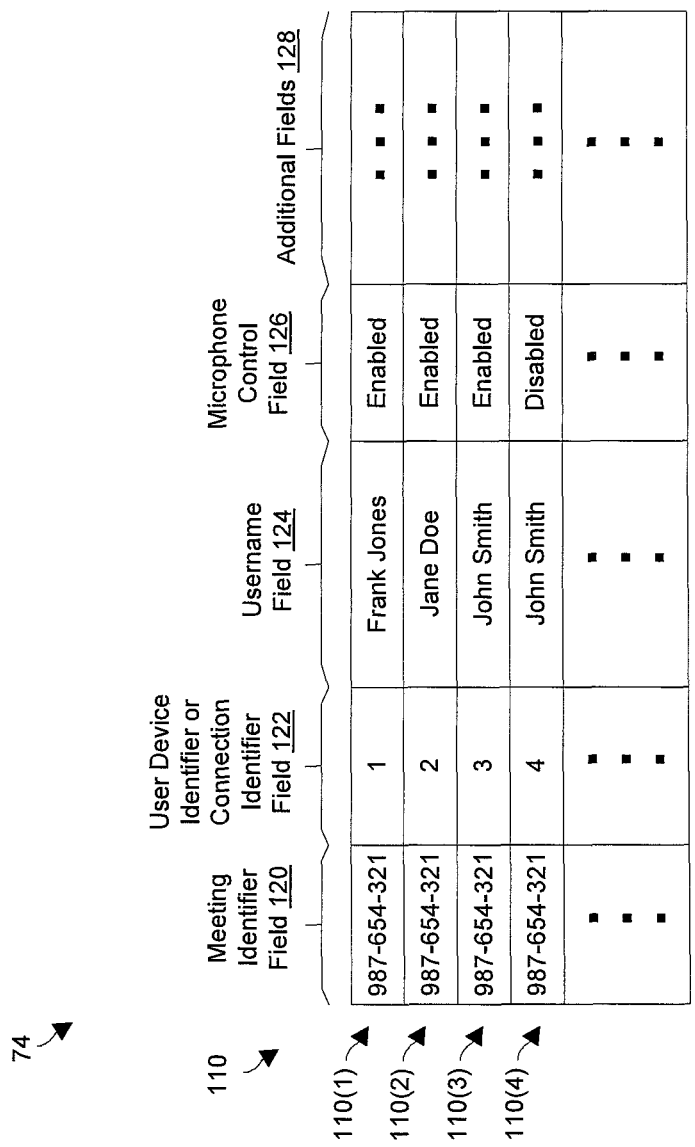
FIG. 5 is a block diagram of the portion of the database used by the online meeting server at a subsequent time during the example situation of FIG. 3.

FIGS. 3 through 5 show particular details of the electronic environment 20 in accordance with an example situation in which a user 30 eventually adds a second user device 22 to an online meeting. FIG. 3 shows particular components of the electronic environment 20 which are involved in the example situation. FIG. 4 is a portion of the online meeting database 74 (also see FIG. 2) at a first time during the example situation. FIG. 5 is the portion of the online meeting database 74 at a subsequent time during the example situation. It should be understood that the example situation may take place within the electronic environment 20 although particular details of the electronic environment 20 (e.g., the cloud) are omitted from FIG. 3 for simplicity.

At an initial time and as shown in FIG. 3, suppose that three users 30(1), 30(2), 30(3) currently participate in an online meeting hosted by the online meeting server 24 via a set of established connections 100. In particular, as illustrated in FIG. 3, suppose that the user 30(1) currently participates in the online meeting using the user device 22(1) which connects to the online meeting server 24 by way of a connection 100(1) (also see the communications medium 26 in FIG. 1). Additionally, suppose that the user 30(2) currently participates in the online meeting using the user device 22(2) by way of another connection 100(2) Likewise, suppose that the user 30(3) currently participates in the online meeting using the user device 22(3) by way of yet another connection 100(3).

FIG. 4 shows a portion of the online meeting database 74 which the online meeting server 24 maintains while hosting the online meeting (also see FIG. 2). As shown in FIG. 4, the online meeting database 74 includes entries 110(1), 110(2), 110(3), . . . (collectively, database entries 110) identifying established connections 100 with the online meeting server 24. Each entry 110 includes a meeting identifier (or meeting ID) field 120, a user device identifier (or user device ID) field 122, a username field 124, a microphone control field 126, and other fields 128.

The meeting ID field 120 of each entry 110 holds a meeting ID which uniquely identifies a particular online meeting among other online meetings (i.e., to distinguish hosted online meetings from each other). For example, the entries 110(1), 110(2), 110(3) contain "987-654-321" to indicate that the entries 110(1), 110(2), 110(3) relate to the same online meeting, i.e., online meeting "987-654-321". Nevertheless, the database 74 can include additional entries 110 for other online meetings as well (i.e., entries 110 for other meeting IDs).

The user device ID field 122 of each entry 110 holds a user device ID or connection ID which uniquely identifies a particular user device 22 joined to an online meeting or connection 100. The online meeting server 24 uses the contents of the field 122 to distinguish joined user devices 22 from each other. For example, the first entry 110(1) represents the first user device 22(1) which connects to the online meeting server 24 through the connection 100(1), the second entry 110(2) represents the second user device 22(1) which connects to the online meeting server 24 through the connection 100(2), the third entry 110(3) represents the third user device 22(3) which connects to the online meeting server 24 through the connection 100(3), and so on.

The username field 124 of each entry 110 holds a username to identify a particular user 30 on the connection 100 of that entry 110. The online meeting server 24 can provide the username of the current person who is speaking to all of the user devices 22 in order to inform the participants of the online meeting which user 30 is currently talking. If the user device 22 is a smart device (e.g., a desktop computer), the user device 22 can provide a character string as the username (e.g., a person's typed-in name). However, if the user device 22 is not a smart device (e.g., a simple telephone), the user may simply enter a number as the username (e.g., a user PIN entered through a telephone key pad) or may not provide optional data. Along these lines, the username for the entry 110(1) is "Frank Jones" (e.g., the user device 22(1) is a smart device), the username for the entry 110(1) is "Jane Doe" (e.g., the user device 22(2) is a smart device), username for the entry 110(1) is "Phone Caller" (e.g., the user device 22(3) is a standard telephone), and so on.

The microphone control field 126 of each entry 110 holds a microphone control parameter control audio input on the connection 100 of that entry 110. By way of example only, all of the microphones of the user devices 22(1), 22(2), 22(3) are initially open (i.e., enabled or operating) and thus provide audio input from the users 30(1), 30(2), 30(3).

The other fields 128 hold additional online meeting information. For example, the other fields 128 hold data indicating which user 30 is the current presenter, which user devices 22 are smart devices (e.g., PCs, tablets, smart phones, etc.), sound levels, user privileges, connection information, and so on.

During the initial time, the users 30 communicate with each other through the connections 100(1), 100(2), 100(3) to the online meeting server 24 thus enabling the users 30 to engage in an effective online meeting. In particular, for any user devices 22 that are equipped with displays, the user devices 22 are able to display a desktop of a presenter (e.g., a slide show, an electronic drawing, a document, etc.). Additionally, for any user devices 22 that are equipped with cameras, the user devices 22 are able to share video feeds (e.g., to enable the other users 30 to view faces, desk spaces, office areas, etc.). Furthermore, for any user devices 22 that are equipped with microphones and speakers, the user devices 22 are able to share audio feeds (e.g., to engage in productive discussions, to ask questions, to provide explanations, etc.).

In this example situation, suppose that the user device 22(3) currently used by the user 30(3) is a speaker phone (or conference room phone) which is equipped with a microphone and a speaker. Now, suppose that the user device 22(4) is a desktop computer which is robustly provisioned with a display, a microphone, and a speaker, and that the user 30(3) now wishes to join the user device 22(4) to the same online meeting, i.e., to online meeting "987-654-321". Perhaps this is desirable because the user 30(3) now wishes to view visual content that is currently shared among other users 30. Alternatively, perhaps the user 30(3) now wishes to take over as presenter to control presentation of a slide show, drawing, or document, etc.

To connect the user device 22(4) to the online meeting, the user 30(3) directs the user device 22(4) to join the online meeting. A suitable technique for directing the user device 22(4) to join the online meeting is for the user 30(3) to click on an online meeting link using the user device 22(4) (e.g., from an email message, from a calendar invite, etc.). Another suitable technique for directing the user device 22(4) to join the online meeting is for the user 30(3) to navigate to a website of the online meeting server 24 and enter the meeting details into the website. Other well-defined techniques for joining the online meeting are suitable for use as well.

In response to the user's input, the user device 22(4) provides the meeting identifier (i.e., "987-654-321") to properly identify the online meeting to the online meeting server 24 and a username (i.e., "John Smith") to properly identify the user 30. In response, the online meeting server 24 adds a new entry 110(4) to the database 74 (see FIG. 5) and establishes a connection 110(4) to the user device 22(4) (FIG. 4). Initially, the microphone control field 126 of the entry 110(4) may include an "enabled" control parameter thus enabling the microphone of the newly connected user device 22(4) to provide audio input back to the online meeting server 24 over the connection 100(4) (also see FIG. 3).

Shortly after the connection 110(4) is established, the online meeting server 24 provides a respective audio output signal 40 to each smart user device 22 (e.g., as determined by the additional fields 128 in the entries 110 of the database 74) directing that smart user device 22 to play a particular sound (e.g., a unique tone, a unique series of audio tones, etc.). In particular, the online meeting server 24 sends an audio signal 40(1) to the user device 22(1) directing the user device 22(1) play a first sound. Similarly, the online meeting server 24 sends an audio signal 40(2) to the user device 22(2) directing the user device 22(2) play a second sound which is different than the first sound. Likewise, the online meeting server 24 sends an audio signal 40(3) to the user device 22(4) directing the user device 22(4) play a third sound which is different from the other sounds.

In FIG. 3, conveyance of the particular sound from the user device 22(4) to the user device 22(3) is illustrated by arrow 112. During this activity, the online meeting server 24 senses the connection 100(3) to determine whether any of the played sounds are captured by the user device 22(3) and sent back in an audio input signal 114 on the connection 100(3) (FIG. 3). In particular, if the audio input signal 114 includes the first sound that was sent to the user device 22(1), the online meeting server 24 would conclude that the newly connected user device 22(4) is co-located with the first user device 22(1). Similarly, if the audio input signal 114 includes the second sound that was sent to the user device 22(2), the online meeting server 24 would conclude that the user device 22(3) is co-located with the second user device 22(2). Furthermore, if the audio input signal 114 includes the third sound that was sent to the newly connected user device 22(4), the online meeting server 24 would conclude that the third user device 22(3) is co-located with the newly connected user device 22(4).

In this example situation, since the newly connected user device 22(4) is co-located with the third user device 22(3), the speaker of the newly connected user device 22(4) outputs the sound 112 which is captured by the microphone of the user device 22(3). Accordingly, the audio input signal 114 includes the third sound 112 that was sent to the user device 22(4). As soon as the online meeting server 24 detects the third sound 112 that was played by the newly connected user device 22(4), the online meeting server 24 takes remedial action.

In some arrangements, as the remedial action, the online meeting server 24 automatically disables the microphone input from either the user device 22(3) or the user device 22(4). For example, the online meeting server 24 can be configured to automatically mute the microphone input of the newly connected user device 22(4). This operation is illustrated in FIG. 5 with the contents of the microphone control field 126 of the entry 110(4) set to "disabled". Accordingly, in contrast to conventional web meeting systems, there is little or no possibility of creating a feedback loop (i.e., generating a nuisance helicopter noise). Moreover, in contrast to conventional web meeting systems, there is little or no likelihood that the user 30(3) would then enter a situation in which the user's private conversation is accidentally shared in the online meeting because the user 30(3) improperly thinks that he/she has turned off the microphone of the newly connected user device 22(4).

In some arrangements, as the remedial action, the online meeting server 24 automatically labels both the audio input from the original user device 22(3) and the audio input from the newly connected user device 22(4) with the same username (see FIG. 5). This operation is illustrated in FIG. 5 with the contents of the username field 124 of the entry 110(3) changed from "Phone Caller" to "John Smith". Here, the less detailed username of entry 110(3) is replaced with the more detailed username of entry 110(4). In these arrangements, when the user 30(3) talks on the user device 22(3), the accurate username from the newly connected user device 22(4) is displayed. Accordingly, there is no confusion as to who is talking. Further details will now be provided with reference to FIG. 6.

Figure 6:
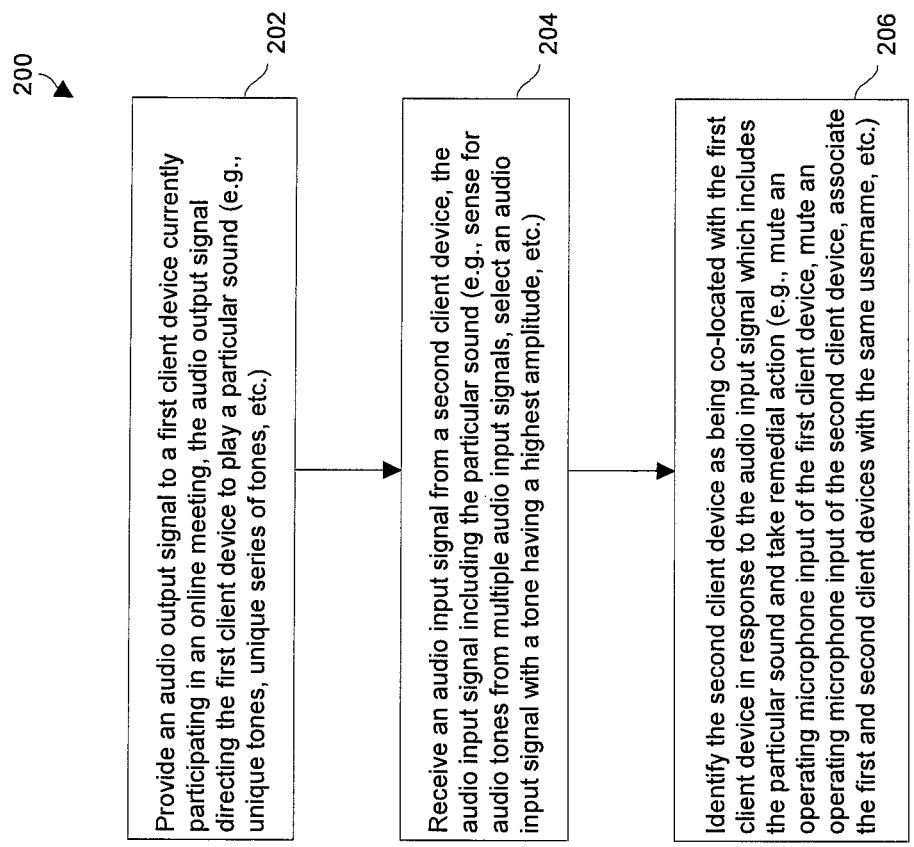
FIG. 6 is a flowchart of a procedure which is performed by the meeting server of FIG. 2.

FIG. 6 is a flowchart of a procedure 200 which is performed by the online meeting server 24 when managing an online meeting. At 202, the online meeting server 24 provides an audio output signal to a first client device currently participating in the online meeting (e.g., a personal computer or other smart device which has just joined the online meeting), the audio output signal directing the first client device to play a particular sound. In some arrangements, the particular sound is a unique tone (e.g., 400 Hz, 700 Hz, 1000 HZ, etc.). A frequency offset of approximately 300 Hz enables at least 10 distinct tones in filtering range for the POTS service (i.e., roughly 300 to 4000 Hz). In other arrangements, the particular sound is a unique sequence of tones (i.e., other client devices play different sequences of tones).

At 204, the online meeting server 24 receives an audio input signal from a second client device (e.g., a regular telephone), the audio input signal including the particular sound. Here, if the second client device has an open microphone co-located with the first client device, the second client device captures the particular sound and includes the particular sound in the audio input signal from the second client device. In some arrangements, if there are multiple sounds (e.g., tones) captured by the second client device, the online meeting server considers the client device that provides the highest amplitude sound (e.g., the loudest tone) as the first client device that is co-located with the second client device.

At 206, the online meeting server 24 identifies the second client device as being co-located with the first client device in response to the audio input signal which includes the particular sound, and takes remedial action. In some arrangements, the online meeting server 24 mutes one of the open microphones (i.e., deactivates an audio input) of one of the first and second client devices (e.g., mutes the first client device, mutes the second client device, etc.). In some arrangements, the online meeting server 24 updates the username so that the first and second client devices share the same username. Other actions are suitable for use as well such as deactivating a microphone and sharing usernames, outputting a warning message, and so on.

As described above, improved techniques are directed to using audio signals to identify when client devices are co-located. Along these lines, an online meeting server may send an audio signal to a first client device of an online meeting in order to cause the first client device to output a particular sound (e.g., a unique tone, a unique tone sequence, etc.). If a second client device of the online meeting captures this particular sound, the meeting server detects that the second client device is co-located with the first client device and is able to take remedial action such as automatically deactivating a microphone of one of the co-located client devices, associating the first and second client devices with the same username, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the meeting server 24 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the particular sounds played by the user devices 22 in response to the audio output signals 40 were described as tones or tone sequences by way of example only. Such sounds may be made aesthetically pleasing to improve the users' experience. Furthermore, other audio identification techniques are suitable for use as well such as time multiplexing the same sound on the various audio output signals 40 sent to the user devices 22, and so on.

It should be understood that the above-described improvements provide a means to identify "open microphones" and automatically mute them. In particular, meeting software on each user device 22 can "ping" (i.e., play a particular sound) to attempt to hear itself via open microphones other than the microphone of that user device 22.

For instance, suppose that the online meeting server 24 knows that a user is using a VoIP configuration, i.e., utilizing a microphone on a personal computer (PC). Further suppose that the online meeting server 24 suspects that the user also is dialed into the call via telephone or other computer (e.g., based on previous history, based on borderline feedback loop behavior, etc.). To determine whether there are two user devices 22 in use by the same user, the online meeting server 24 temporarily mutes the microphone of the PC, and then plays an inquiry "ping" sound through the PC speaker. The online meeting server 24 further listens to the conference call audio (but not the PC microphone which has been muted).

If the online meeting server 24 identifies the "ping" sound, then the online meeting server 24 knows that there is a second microphone is "open" (i.e., that the user has another device connected to the same online meeting). The online meeting server 24 then automatically mutes the PC microphone, allowing the user to continue to use the microphone of the other device for speaking. Moreover, the user can manually un-mute PC microphone to override auto-detection.

It should be further understood that the above-mentioned "ping" sound is more than a simple "ping" noise. Rather, the "ping" sound can include coding (i.e., distinctiveness) to identify to the online meeting server 24 which user device 22 sent the inquiry. In some arrangements, the particular sound replaces a conventional noise that is played when a new user joins an online meeting.

Accordingly, the online meeting server 24 is able to identify the source of the ping, i.e., which currently participating user device 22 is co-located with the newly joining user device 22. This provides a mechanism to automatically associate dial-in connections to PC connections, making it unnecessary for users to enter "codes" when connect to a voice call for a computer based meeting. That is, the online meeting server 24 is now provisioned to auto-associate telephones using dial-in connections to network connected user logon computers, so that the user no longer has to enter a number and # when connecting to a conference audio via telephone. Rather, the online meeting server 24 automatically identifies dual voice connections from one participant in a conference call. Additionally, the online meeting server 24 can automatically mute a user device 22 to prevent the user from being heard inadvertently.

It should be further understood that, in a conventional web conferencing system, when a user connects to an online meeting using computer hosted software and via a phone dial in connection, a feedback loop can be created (e.g., an endless loop helicopter-noise effect) resulting in the user having to manually mute one connection (e.g., the phone) while the unexpected voice over IP connection microphone is still active. Such a situation often results in all participating users checking their microphone mute status. Very often, a user has difficulty figuring out that he/she is the reason for the feedback loop. However, with the improved techniques disclosed herein, the online meeting server 24 identifies double-connections and automatically mutes one.

Moreover, users also commonly mute one microphone, while the other microphone remains audible. They believe their conversations in the room are private while in reality, using a conventional web conferencing system everyone on the call hears what they are saying. For example, suppose that a user mutes a conference call by turning down the speakers then use a third device (a second phone) to make a personal call. In these situations, the contents of the user's conversation on that separate call are then broadcast to everyone on the web conference. However, with the improved techniques disclosed herein, an online meeting server 24 is able to tackle the logistics of arranging for a distinctive (and preferably pleasing) sound to be played and detected without disturbing the user experience.

In one conventional example situation that is avoided by the online meeting server 24, the user does not know that the user is connected to web conference via two devices, i.e., a speaker phone and a PC. A feedback loop is then created, and the user unfortunately does not enter a user number (e.g., 30#) to inform the other participants who the user is (e.g., "Caller 30"). Unfortunately, the conventional web conference server has no choice but to merge the new dial-in connection into the web conference community. Then some noise occurs and it gets broadcast into the PC speakers, goes back into the speaker phone microphone then back to the speakers, and so on, in an endless loop.

In another conventional example situation that is avoided by the online meeting server 24, a user joins a call via two microphone sources, i.e., a telephone and a PC. The user then inadvertently mutes the PC speakers but not the PC microphone before answering a phone call from their doctor office. The entire doctor conversation is then broadcast to the other participants of the web conference, and the conventional web conference server has no means to mute that user, i.e., the conventional web conference server does not even know that the two microphone sources are co-located and operated by the same user.

It should be understood that, as an alternative to playing distinct sounds through each user device 22, the online meeting server 24 can rotate through the user devices 22 using a common sound. That is, the online meeting server 24 briefly and transparently mutes the microphones and/or speakers of the user devices 22 while rotating output of the common sound through the remaining user devices 22 to determine whether there are any user devices that are co-located.

Another technique involves time-based spacing of pings as well as distinct tones. Here, the online meeting server 24 concurrently sends distinct tones to a group of smart devices during a first time period (e.g., 10 different tones to a first group of 10 smart devices). Then, the online meeting server 24 concurrently sends distinct tones to another group of smart devices during a second time period (e.g., 10 different tones to a second group of 10 smart devices), and so on. If each time period consumes a standard amount of time (e.g., 200 ms), a large meeting of many users still can be processed in a very short amount of time. For example, 100 user devices can be tested in banks of 10 during 200 ms intervals in approximately 2 seconds (i.e., 10*200 ms=2 seconds). In this situation, each user will still hear a respective tone thus making efficient use of the filter range of the POTS service (e.g., 300 to 4000 Hz). Furthermore, discovery will only take slightly longer than the amount of time to discover co-located devices in a smaller meeting, i.e., most users won't notice. Moreover, for small meetings, time-based spacing is unnecessary.

Additionally, in some arrangements, all or parts of the dual-connection detection operation which was described above as being performed primarily by the online meeting server 24 is offloaded to the user devices 22. That is, the user devices 22 are equipped with online meeting clients which direct operation of the user devices 22. Accordingly, each user device 22 is capable of locally muting its microphone and/or speakers under control of the online meeting server 24 rather than relying on the online meeting server 24 to perform such operations directly. Such modifications and enhancements are intended to belong to various embodiments of the disclosure.

What is claimed is:

1. A method of managing an online meeting, the method comprising:
    providing, by electronic circuitry, an audio output signal to a first client device currently participating in the online meeting, the audio output signal directing the first client device to play a particular sound;

receiving, by the electronic circuitry, an audio input signal from a second client device, the audio input signal including the particular sound; and
identifying, by the electronic circuitry, the second client device as being co-located with the first client device in response to the audio input signal which includes the particular sound;
wherein a first audio input signal, from a first candidate device, includes the particular sound at a first volume level;
wherein a second audio input signal, from a second candidate device, includes the particular sound at a second volume level; and
wherein identifying the second client device includes selecting, as the second client device, one of the first and second candidate devices based on the first and second volume levels.

2. A method as in claim 1 wherein the first client device includes a first operating microphone input; wherein the second client device includes a second operating microphone input; and wherein the method further comprises:
after identifying the second client device as being co-located with the first client device, automatically muting one of (i) the first operating microphone input of the first client device and (ii) the second operating microphone input of the second client device.

3. A method as in claim 2 wherein automatically muting includes:
muting the second operating microphone input of the second client device while maintaining activation of the first operating microphone input of the first client device to continue to receive an audio input signal from the first client device.

4. A method as in claim 2 wherein automatically muting includes:
muting the first operating microphone input of the first client device while maintaining activation of the second operating microphone input of the second client device to continue to receive the audio input signal from the second client device.

5. A method as in claim 2 wherein the electronic circuitry associates participant identifiers with client devices participating in the online meeting; wherein the electronic circuitry initially associates (i) a first participant identifier with the first client device and (ii) a second participant identifier with the second client device; wherein one of the first participant identifier and the second participant identifier is a username, and the other of the first participant identifier and the second participant identifier is an anonymous label; and wherein the method further comprises:
after identifying the second client device as being co-located with the first client device, concurrently associating the username with (i) the first client device and (ii) the second client device.

6. A method as in claim 2, further comprising:
detecting a disconnection event in which one of the first client device and the second client device disconnects from the online meeting; and
automatically un-muting the one of the first operating microphone input of the first client device and the second operating microphone input of the second client device in response to detection of the disconnection event.

7. A method as in claim 2 wherein one of the first client device and the second client device is a desktop computer, and the other of the first client device and the second client device is a phone apparatus.

8. A method as in claim 1 wherein providing the audio output signal to the first client device includes:
providing different audio output signals to different client devices currently participating in the online meeting, the different client devices playing different sounds.

9. A method as in claim 8 wherein providing the different audio output signals to the different client devices currently participating in the online meeting includes:
directing the different client devices to play different audio tones, the first client device playing, as the particular sound, a unique audio tone.

10. A method as in claim 9 wherein each of the different audio tones corresponds to a respective frequency offset.

11. A method as in claim 1 wherein receiving the audio input signal from the second client device includes:
receiving multiple audio input signals from multiple client devices currently participating in the online meeting, at least one of the multiple audio input signals including the particular sound played by the first client device.

12. A method as in claim 1, further comprising:
joining the first client device to the online meeting, the electronic circuitry providing the audio output signal to the first client device in response to the first client device joining the online meeting.

13. A method as in claim 1, further comprising:
joining the second client device to the online meeting, the electronic circuitry providing the audio output signal to the first client device in response to the second client device joining the online meeting.

14. A method as in claim 1, further comprising:
detecting an audio feedback event in the online meeting, the electronic circuitry muting audio input from one of the first and second client devices in response to detection of the audio feedback event.

15. An electronic apparatus, comprising:
a communications interface constructed and arranged to communicate with client devices;
memory; and
control circuitry coupled to the communications interface and the memory, the memory storing instructions which, when carried out by the control circuitry, cause the control circuitry to:
provide an audio output signal to a first client device currently participating in the online meeting, the audio output signal directing the first client device to play a particular sound,
receive an audio input signal from a second client device, the audio input signal including the particular sound, and
identify the second client device as being co-located with the first client device in response to the audio input signal which includes the particular sound;
wherein a first audio input signal, from a first candidate device, includes the particular sound at a first volume level;
wherein a second audio input signal, from a second candidate device, includes the particular sound at a second volume level; and
wherein the control circuitry, when identifying the second client device, is constructed and arranged to select, as the second client device, one of the first and second candidate devices based on the first and second volume levels.

16. An electronic apparatus as in claim 15 wherein the first client device includes a first operating microphone input; wherein the second client device includes a second operating microphone input; and wherein the control circuitry is further configured to:

after identifying the second client device as being co-located with the first client device, automatically mute one of (i) the first operating microphone input of the first client device and (ii) the second operating microphone input of the second client device.

17. A non-transitory computer readable medium which stores a set of instructions to manage an online meeting, the set of instructions, when carried out by computerized circuitry, causing the computerized circuitry to perform a method of:
   providing an audio output signal to a first client device currently participating in the online meeting, the audio output signal directing the first client device to play a particular sound;
   receiving an audio input signal from a second client device, the audio input signal including the particular sound; and
   identifying the second client device as being co-located with the first client device in response to the audio input signal which includes the particular sound;
   wherein a first audio input signal, from a first candidate device, includes the particular sound at a first volume level;
   wherein a second audio input signal, from a second candidate device, includes the particular sound at a second volume level; and
   wherein identifying the second client device includes selecting, as the second client device, one of the first and second candidate devices based on the first and second volume levels.

18. A non-transitory computer readable medium as in claim 17 wherein the first client device includes a first operating microphone input; wherein the second client device includes a second operating microphone input; and wherein the method further comprises:
   after identifying the second client device as being co-located with the first client device, automatically muting one of (i) the first operating microphone input of the first client device and (ii) the second operating microphone input of the second client device.

19. A method as in claim 1 wherein the first and second candidate devices are co-located within a common environment which is conducive to creation of an audio feedback loop; and
   wherein selecting, as the second client device, one of the first and second candidate devices includes, in response to a determination that the first and second candidate devices reside within the common environment, (i) maintaining participation of the first candidate device in the online meeting with a microphone input of the first candidate device in an activated state and (ii) maintaining participation of the second candidate device in the online meeting with a microphone input of the second candidate device in a de-activated state to prevent creation of the audio feedback loop.

20. An electronic apparatus as in claim 15 wherein the first and second candidate devices are co-located within a common environment which is conducive to creation of an audio feedback loop; and
   wherein the control circuitry, when selecting, as the second client device, one of the first and second candidate devices is constructed and arranged to, in response to a determination that the first and second candidate devices reside within the common environment, (i) maintain participation of the first candidate device in the online meeting with a microphone input of the first candidate device in an activated state and (ii) maintain participation of the second candidate device in the online meeting with a microphone input of the second candidate device in a de-activated state to prevent creation of the audio feedback loop.

21. A non-transitory computer readable medium as in claim 17 wherein the first and second candidate devices are co-located within a common environment which is conducive to creation of an audio feedback loop; and
   wherein selecting, as the second client device, one of the first and second candidate devices includes, in response to a determination that the first and second candidate devices reside within the common environment, (i) maintaining participation of the first candidate device in the online meeting with a microphone input of the first candidate device in an activated state and (ii) maintaining participation of the second candidate device in the online meeting with a microphone input of the second candidate device in a de-activated state to prevent creation of the audio feedback loop.

* * * * *